US012459119B2

(12) United States Patent
Groth et al.

(10) Patent No.: US 12,459,119 B2
(45) Date of Patent: Nov. 4, 2025

(54) METHOD OF CONTROLLING INDUSTRIAL ROBOT, CONTROL SYSTEM AND ROBOT SYSTEM

(71) Applicant: ABB Schweiz AG, Baden (CH)

(72) Inventors: Tomas Groth, Västerås (SE); Tomas Olsson, Enköping (SE)

(73) Assignee: ABB Schweiz AG, Baden (CH)

( * ) Notice: Subject to any disclaimer, the term of this patent is extended or adjusted under 35 U.S.C. 154(b) by 207 days.

(21) Appl. No.: 17/996,352

(22) PCT Filed: Apr. 22, 2020

(86) PCT No.: PCT/EP2020/061134
§ 371 (c)(1),
(2) Date: Oct. 17, 2022

(87) PCT Pub. No.: WO2021/213639
PCT Pub. Date: Oct. 28, 2021

(65) Prior Publication Data
US 2023/0202041 A1    Jun. 29, 2023

(51) Int. Cl.
*B25J 9/16* (2006.01)
(52) U.S. Cl.
CPC ........... *B25J 9/1666* (2013.01); *B25J 9/1633* (2013.01)
(58) Field of Classification Search
CPC .................. B25J 9/1666; B25J 9/1633; G05B 2219/40202
See application file for complete search history.

(56) References Cited

U.S. PATENT DOCUMENTS

| 8,350,806 | B2 * | 1/2013 | Nagasaka | ............... | G06F 3/016 |
| | | | | | 600/595 |
| 9,805,491 | B2 * | 10/2017 | Herman | ................. | A63F 13/52 |
| 9,844,878 | B2 * | 12/2017 | Haddadin | ............. | B25J 9/1666 |

(Continued)

FOREIGN PATENT DOCUMENTS

| CN | 104858876 A | 8/2015 |
| CN | 107683440 A | 2/2018 |

(Continued)

OTHER PUBLICATIONS

Haddadin et al., Collision Detection and Reaction: A Contribution to Safe Physical Human-Robot Interaction, Sep. 22-26, 2008, 2008 IEEE/RSJ International Conference on Intelligent Robots and Systems, pp. 3356-3363 (Year: 2008).*

(Continued)

*Primary Examiner* — Sze-Hon Kong
(74) *Attorney, Agent, or Firm* — Whitmyer IP Group LLC

(57) ABSTRACT

A method of controlling an industrial robot, the method including visualizing a nominal path of the industrial robot, the nominal path being associated with a nominal trajectory of the industrial robot; visualizing indications of values of at least one parameter of the industrial robot as when executing the nominal trajectory, for evaluating a risk potential of a physical contact between the industrial robot and a human; receiving a user input related to the nominal trajectory; modifying the nominal trajectory based on the user input to provide a modified trajectory; and executing the modified trajectory by the industrial robot. A control system and an industrial robot are also provided.

19 Claims, 6 Drawing Sheets

(56) References Cited

U.S. PATENT DOCUMENTS

| | | | |
|---|---|---|---|
| 9,919,427 B1* | 3/2018 | Guilbert | B25J 9/1664 |
| 10,155,312 B2 | 12/2018 | Feldmann et al. | |
| 12,172,322 B2* | 12/2024 | Hane | B25J 9/1671 |
| 2007/0171194 A1* | 7/2007 | Conti | G06F 3/011 |
| | | | 345/156 |
| 2012/0043831 A1* | 2/2012 | Sakakibara | B25J 9/1674 |
| | | | 307/326 |
| 2013/0345872 A1* | 12/2013 | Brooks | B25J 9/1676 |
| | | | 700/264 |
| 2014/0371871 A1* | 12/2014 | Farina | A61F 2/54 |
| | | | 623/24 |
| 2015/0131896 A1* | 5/2015 | Hu | G06V 40/28 |
| | | | 382/153 |
| 2015/0239124 A1 | 8/2015 | Haddadin et al. | |
| 2015/0294143 A1* | 10/2015 | Wells | G06V 40/23 |
| | | | 348/159 |
| 2016/0016315 A1* | 1/2016 | Kuffner, Jr. | B25J 19/06 |
| | | | 901/49 |
| 2016/0100898 A1* | 4/2016 | Jinno | A61B 34/37 |
| | | | 606/130 |
| 2016/0354925 A1* | 12/2016 | Shimodaira | B25J 9/1633 |
| 2017/0087722 A1* | 3/2017 | Aberg | B25J 9/1697 |
| 2017/0197313 A1* | 7/2017 | Nishino | A61B 5/02055 |
| 2017/0364076 A1* | 12/2017 | Keshmiri | G05B 19/41 |
| 2017/0372139 A1* | 12/2017 | Thomasson | G06V 20/20 |
| 2018/0126553 A1* | 5/2018 | Corkum | B25J 9/1697 |
| 2018/0154518 A1* | 6/2018 | Rossano | B25J 9/1671 |
| 2018/0354136 A1* | 12/2018 | Carlisle | B25J 13/085 |
| 2019/0105779 A1* | 4/2019 | Einav | B25J 9/1689 |
| 2019/0126475 A1* | 5/2019 | Kawanishi | B25J 9/1692 |
| 2019/0344445 A1* | 11/2019 | Song | B25J 9/1697 |
| 2020/0054412 A1* | 2/2020 | Fuerst | A61B 17/00 |
| 2020/0101610 A1* | 4/2020 | Thackston | B25J 9/1612 |
| 2020/0189103 A1* | 6/2020 | D'Ercoli | G06N 5/02 |
| 2020/0254610 A1* | 8/2020 | Maier | B25J 13/08 |
| 2020/0276709 A1* | 9/2020 | Riedel | B25J 9/1676 |
| 2020/0377085 A1* | 12/2020 | Floyd-Jones | B60W 60/0011 |
| 2020/0394405 A1* | 12/2020 | Fukui | B25J 13/00 |
| 2021/0170603 A1* | 6/2021 | Kotlarski | B25J 13/006 |
| 2021/0331318 A1* | 10/2021 | Hwang | B25J 9/1651 |
| 2022/0101602 A1* | 3/2022 | Serrat | G06F 18/214 |
| 2022/0152837 A1* | 5/2022 | Das | B25J 13/065 |
| 2022/0226995 A1* | 7/2022 | Beck | B25J 9/1641 |
| 2022/0331960 A1* | 10/2022 | Suzuki | B25J 9/1676 |

FOREIGN PATENT DOCUMENTS

| | | |
|---|---|---|
| DE | 102013110905 A1 | 4/2015 |
| EP | 2364243 A1 | 9/2011 |
| KR | 20170108526 A | 9/2017 |
| KR | 101976358 B1 | 8/2019 |
| WO | 2016037658 A1 | 3/2016 |

OTHER PUBLICATIONS

Schlotzhauer et al., On the trustability of the safety measures of collaborative robots: 2D Collision-force-map of a sensitive manipulator for safe HRC, 2019, IEEE 15th International Conference on Automation Science and Engineering, pp. 1676-1683 (Year: 2019).*

Ragaglia et al, Integration of perception, control and injury knowledge for safe human-robot interaction, May 31-Jun. 7, 2014, Hong Kong, China, 2014 IEEE International Conference on Robotics & Automation, pp. 1196-1202 (Year: 2014).*

Sur et al., Robots that Anticipate Pain: Anticipating Physical Perturbations from Visual Cues through Deep Predictive Models, Sep. 24-28, 2017, 2017 IEEE/RSJ International Conference on Intelligent Robots and Systems, pp. 5541-5548 (Year: 2017).*

Najmaei et al., Human Factors for Robot Safety Assessment, Jul. 6-9, 2010, 2010 IEEE/ASME International Conference on Advanced Intelligent Mechatronics, pp. 539-544 (Year: 2010).*

Sisbot et al., Synthesizing Robot Motions Adapted to Human Presence, Jun. 15, 2010, Springer Science & Business Media BV 2010, pp. 329-343 (Year: 2010).*

Toz, Menti, et al.; "Dynamics Simulation Toolbox for Industrial Robot Manipulators"; Computer Applications in Engineering Education, vol. 18, Issue 2; Wiley Periodicals Inc.; Jun. 2009; 12 Pages.

International Preliminary Report on Patentability; Application No. PCT/EP2020/061134; Issued: Oct. 25, 2022; 14 Pages.

International Search Report and Written Opinion of the International Searching Authority; Application No. PCT/EP2021/061134; Completed: Jan. 13, 2021; Mailing Date: Jan. 22, 2021; 21 Pages.

Chinese Office Action; Application No. 202080099814.9; Issued: Dec. 27, 2024; 23 Pages.

Chinese Second Office Action; Application No. 202080099814.9; Completed: May 12, 2025; Issued: Jun. 7, 2025; 24 Pages.

Communication pursuant to Article 94(3) EPC; Application No. 20 721 189.7; Issued: Sep. 9, 2025; 13 Pages.

* cited by examiner

METHOD OF CONTROLLING INDUSTRIAL ROBOT, CONTROL SYSTEM AND ROBOT SYSTEM

TECHNICAL FIELD

The present disclosure generally relates to control of an industrial robot. In particular, a method of controlling an industrial robot, a control system for controlling an industrial robot, and a robot system comprising an industrial robot and a control system, are provided.

BACKGROUND

Some industrial robots are designed to share a workspace with a human for collaboration work. Humans have an excellent capability of solving imprecise exercises while industrial robot exhibit precision, power and endurance.

Safety is of major importance when a human shares a workspace with an industrial robot. A comprehensive risk analysis therefore needs to be made prior to collaborative operation between the industrial robot and a human. For example, transient contact situations between the industrial robot and the human need to be considered. A transient contact is a contact between a human and a part of the industrial robot where the human body part is not clamped and can recoil or retract from the moving part of the industrial robot. When deciding strategy for transient contact situations between a human and the industrial robot, it is often up to the user to calculate the energy transfer in the collision or to estimate the effective mass of the industrial robot.

In some prior art robot systems, it is possible to visualize safety zones of the industrial robot. However, the user often has no or little knowledge regarding a risk potential of a physical contact between the industrial robot and a human. It may be very difficult for a robot programmer to estimate how dangerous various movements of the industrial robot are.

One straightforward way to make the industrial robot more safe is to lower the speeds thereof. However, this measure risks to unnecessary decrease the efficiency of the industrial robot.

WO 2016037658 A1 discloses a robot controller for controlling the operation of a robot unit. The robot unit comprises a plurality of robot arms that each comprises at least one motion mechanism adapted to set the robot arm in motion, wherein a tool of the robot unit is adapted to be moved along an operational path. The robot controller is adapted to determine the kinetic energy subjected to each motion mechanism of the robot arms, and, on basis of the determined kinetic energies, control the speed of each motion mechanism, while maintaining a movement of the tool along the operational path, so that said kinetic energy does not exceed a certain level.

US 2017372139 A1 discloses a method for displaying a representative path associated with a robotic device. The method comprises displaying one or more graphical indicators that represent various types of information associated with components of the robotic device. By means of the method, a three-dimensional representation of the path of the robotic device can be viewed within an operating environment of the robotic device, allowing potential collisions to be detected, before such collisions take place.

SUMMARY

One object of the present disclosure is to provide a method of controlling an industrial robot, which method enables a safe operation of the industrial robot.

A further object of the present disclosure is to provide a method of controlling an industrial robot, which method enables an effective operation of the industrial robot.

A still further object of the present disclosure is to provide a method of controlling an industrial robot, which method enables an improved risk assessment of operations of the industrial robot.

A still further object of the present disclosure is to provide a method of controlling an industrial robot, which method enables a safe operation of the industrial robot in a simple, reliable and/or intuitive manner.

A still further object of the present disclosure is to provide a method of controlling an industrial robot, which method has an improved user experience.

A still further object of the present disclosure is to provide a method of controlling an industrial robot, which method solves several or all of the foregoing objects in combination.

A still further object of the present disclosure is to provide a control system for controlling an industrial robot, which control system solves one, several or all of the foregoing objects.

A still further object of the present disclosure is to provide an industrial robot comprising a control system, which industrial robot solves one, several or all of the foregoing objects.

According to one aspect, there is provided a method of controlling an industrial robot, the method comprising visualizing a nominal path of the industrial robot, the nominal path being associated with a nominal trajectory of the industrial robot; visualizing indications of values of at least one parameter of the industrial robot as when executing the nominal trajectory, for evaluating a risk potential of a physical contact between the industrial robot and a human; receiving a user input related to the nominal trajectory; modifying the nominal trajectory based on the user input to provide a modified trajectory; and executing the modified trajectory by the industrial robot.

By means of the method, a severity of a potential collision between the industrial robot and the human can easily be evaluated. Instead of simply reducing the speeds of the industrial robot until the values of the at least one parameter is sufficiently low, the method enables the user to more effectively address the occurrence of a parameter value associated with a high risk potential. For example, the user may reprogram the industrial robot such that the industrial robot executes the high risk operation outside a collaborative workspace. In this way, safe operation of the industrial robot can be ensured without reducing the efficiency, or with a less reduced efficiency, of the industrial robot.

Furthermore, by means of the method, the user can easily understand whether the industrial robot can be programmed to move faster in one or more movement segments, without compromising safety. This may for example be the case if the indications indicate values of the at least one parameter that are below a threshold value along one or more movement segments.

Furthermore, by means of the method, the user more easily understands which particular movement segments of the path that are critical, if any. For example, in contrast to lowering the speed along the entire nominal trajectory, which may unnecessarily reduce the efficiency of the industrial robot, the user can more effectively modify the nominal trajectory by addressing particular movement segments that do not meet a certain safety requirement. In this way, unnecessary modification of the nominal trajectory can be avoided and a reduction of the efficiency of the industrial robot can be kept minimal.

The method enables the user, such as an integrator, to effectively ensure safe operation of the industrial robot, for example prior to start of production by means of the industrial robot. If the indications show that there is a high risk potential of a physical contact between the industrial robot and the human, the user may modify the nominal trajectory. The modification of the nominal trajectory may or may not comprise a modification of the path. In some situations, a modification of the path enables a reduced risk potential of physical contacts with no or little reduction in efficiency of the industrial robot.

A physical contact between the industrial robot and the human can occur either intentionally or unintentionally. The at least one parameter may characterize the physical contact event. By means of the visualized indications, also a risk potential of a physical contact between the industrial robot and another object, such as an animal, can be evaluated.

A risk potential of a physical contact between the industrial robot and a human should not be confused with a risk of occurrence of such physical contact. That is, the visualized indications assist in evaluating a physical contact's risk potential, should such physical contact occur. The visualized indications indicate the properties of a potential collision.

A path contains a geometrical profile while a trajectory additionally contains a speed profile along the path. Thus, several different trajectories may be associated with a single path.

An indication of a value of at least one parameter shows something more than just the value of the parameter, e.g. presented as a number. Although the indication of the value may contain a number, the indication of the value is an illustration that enables the user to more easily perceive the value.

The industrial robot does not have to physically execute the nominal trajectory when visualizing the indications as when executing the nominal trajectory. Rather, the visualization of the indications as when executing the nominal trajectory may be based on simulations of the execution.

The visualization of the nominal path may comprise visualizing movements of one or more parts of the industrial robot as when executing the nominal trajectory. For example, the visualization of the nominal path may comprise visualizing movements of each link when the industrial robot executes the nominal trajectory.

In order to visualize the nominal path, the entire nominal path may or may not be displayed at the same time. For example, the visualization of the nominal path may comprise visualizing the industrial robot as when executing the nominal trajectory. In this case, the movements of the tool center point of the industrial robot is one example of a visualization of the nominal path. The nominal path and the indications may be visualized on a display.

The at least one parameter may comprise acceleration, force, torque, pressure and/or kinetic energy. The at least one parameter may thus be associated with an energy transfer between the industrial robot and the human in case of a physical contact therebetween. Each of the acceleration, force, torque, pressure and kinetic energy may also be related to the characteristics of a transient contact between the industrial robot and the human.

The at least one parameter may alternatively, or additionally, be associated with a physical property of the industrial robot, or a part thereof. Examples of such physical properties are hardness of one or more links (e.g. if pads are provided on the links or not) and shapes of the links, such as sharpness of edges of the links.

The method may further comprise estimating an effective mass of the industrial robot, and determining values of the at least one parameter based on the effective mass.

The indications may comprise a direction associated with a respective value of the at least one parameter. The direction may be visualized with an arrow. In this case, a length of the arrow may indicate the magnitude of the value. Examples of parameters that may be visualized by means of an indication comprising such direction are acceleration, force, torque, pressure and/or kinetic energy.

The indications may comprise indications of values of the at least one parameter in relation to a specific body part of the human. This is advantageous since different body parts will have different thresholds for withstanding biomechanical load without incurring minor injury. The method may thus further comprise receiving a user input indicating a specific body part of the human. For example, the indications may indicate values of the at least one parameter when the industrial robot collides with a head, a hand, a leg or a torso of the human. To this end, a body model representing the human and consisting of individual body segments characterized by biomechanical properties may be used.

Alternatively, or in addition, the indications may comprise indications of values of the at least one parameter in relation to a specific mass of the human. The method may thus further comprise receiving a user input indicating a mass of the human. The dangerousness of a physical contact with the industrial robot may be visualized as higher for a human of low mass, and vice versa.

Alternatively, or in addition, the indications may comprise indications of values of the at least one parameter in relation to a degree of protection worn by the human. For example, a type of protective wear or whether any body parts of the human are exposed may be considered.

The indications may comprise indications of values of the at least one parameter in relation to a type of contact event between the industrial robot and the human. Examples of different contact events are a quasi-static contact and a transient contact.

The method may further comprise visualizing the industrial robot. The industrial robot may be visualized on the display. The industrial robot may or may not move concurrently when visualizing the indications. By visualizing the industrial robot as moving, also the nominal trajectory can be visualized.

The indications may comprise indications of values of at least one parameter of a part of the industrial robot. Examples of such parts are links, joints, a wrist and an end effector of the industrial robot. Also a workpiece may be considered to constitute a part of the industrial robot when being carried by the industrial robot. According to one example, the indications comprise indications of values of at least one parameter of a plurality of parts of the industrial robot. In this way, a user can easily understand with which part of the industrial robot it is most dangerous to collide with at a certain moment.

The indications may comprise indications visualized along the nominal path. Target points of the nominal path may also be visualized, e.g. on the display.

The indications may be color indications. A color scale may be used to indicate the dangerousness of the at least one parameter.

The indications may show whether the values are below or above a threshold value. For example, a red colored indication may be used to indicate that a value is above a threshold value and a green colored indication may be used to indicate that a value is below the threshold value. The threshold value may be a threshold value for transient contact or for energy transfer between the industrial robot and the human.

The method may further comprise visualizing a modified path associated with the modified trajectory; and visualizing indications of values of the at least one parameter of the industrial robot as when executing the modified trajectory. Thus, once the user has modified the nominal trajectory to provide the modified trajectory, the visualizations of the method may be repeated again. The modified path and the indications of values of the at least one parameter of the industrial robot as when executing the modified trajectory may be visualized on the display.

The method may further comprise automatically modifying the nominal trajectory to provide the modified trajectory in response to the user input. The modification of the nominal trajectory may or may not comprise a modification of the path associated with the nominal trajectory.

The automatic modification may comprise optimizing the nominal trajectory with a condition to provide a modified trajectory with values of the at least one parameter below a threshold value at least partly along a modified path associated with the modified trajectory.

Alternatively, or in addition, the automatic modification may comprise optimizing the nominal trajectory to minimize a time of a movement between two target points along the nominal path. This can enable a selection of a better path for the industrial robot.

The industrial robot may be designed to interact with a human in a shared collaborative workspace. The industrial robot may thus be a collaborative robot.

According to a further aspect, there is provided a control system for controlling an industrial robot, the control system comprising at least one data processing device and at least one memory having a computer program stored thereon, the computer program comprising program code which, when executed by the at least one data processing device, causes the at least one data processing device to perform the steps of commanding visualization of a nominal path of the industrial robot, the nominal path being associated with a nominal trajectory of the industrial robot; commanding visualization of indications of values of at least one parameter of the industrial robot as when executing the nominal trajectory, for evaluating a risk potential of a physical contact between the industrial robot and a human; receiving a user input related to the nominal trajectory; modifying the nominal trajectory based on the user input to provide a modified trajectory; and commanding execution of the modified trajectory by the industrial robot.

According to a further aspect, there is provided a robot system comprising an industrial robot and a control system according to the present disclosure.

BRIEF DESCRIPTION OF THE DRAWINGS

Further details, advantages and aspects of the present disclosure will become apparent from the following embodiments taken in conjunction with the drawings, wherein.

DETAILED DESCRIPTION

Figure 1:
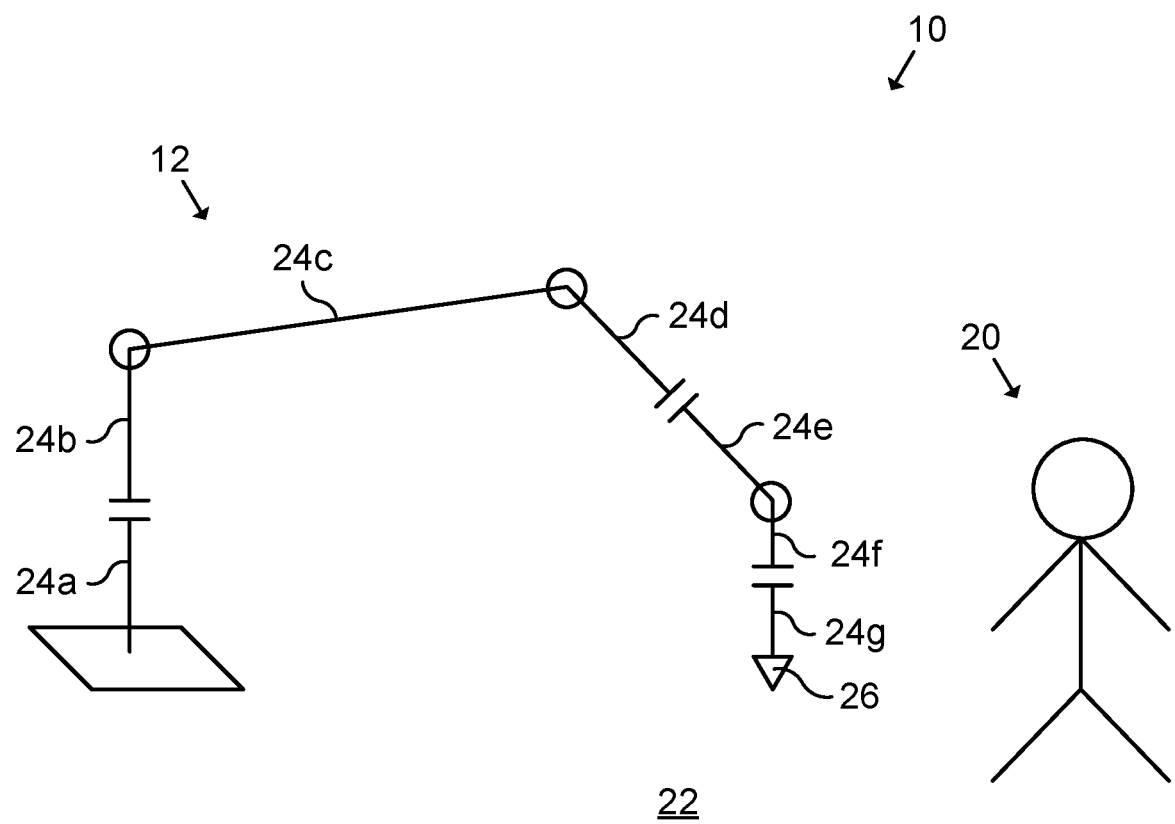
FIG. 1: schematically represents a robot system comprising an industrial robot.
Figure 1:
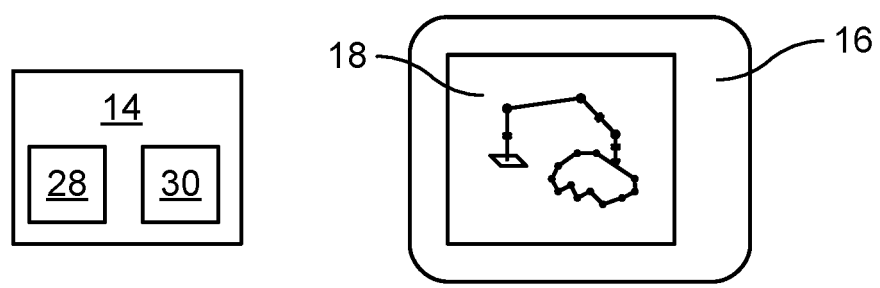

In the following, a method of controlling an industrial robot, a control system for controlling an industrial robot, and a robot system comprising an industrial robot and a control system, will be described. The same or similar reference numerals will be used to denote the same or similar structural features.

FIG. 1 schematically represents a robot system 10. The robot system 10 comprises an industrial robot 12 and a control system 14. The robot system 10 of this example further comprises a teach pendant unit 16 having a display 18. The display 18 does however not necessarily need to be provided on a teach pendant unit 16. The display 18 may for example alternatively be provided on a personal computer.

FIG. 1 further shows a human 20 and a collaborative workspace 22. The industrial robot 12 and the human 20 can perform tasks in the collaborative workspace 22 concurrently during a production operation.

The industrial robot 12 of this specific example comprises a first link 24a, a second link 24b rotatable relative to the first link 24a at a first joint, a third link 24c rotatable relative to the second link 24b at a second joint, a fourth link 24d rotatable relative to the third link 24c at a third joint, a fifth link 24e rotatable relative to the fourth link 24d at a fourth joint, a sixth link 24f rotatable relative to the fifth link 24e at a fifth joint, and a seventh link 24g rotatable relative to the sixth link 24f at a sixth joint. One, several or all of the links 24a-24g may also be referred to with reference numeral "24". The industrial robot 12 further comprises an end effector 26. The end effector 26 is rigidly connected to the seventh link 24g.

The industrial robot 12 in FIG. 1 is however only one of many examples. The industrial robot 12 may for example also comprise one or more translational joints.

The control system 14 of this example comprises a data processing device 28 and a memory 30. The memory 30 contains program code, which when executed by the data processing device 28, causes the data processing device 28 to execute, or command execution of, various steps as described herein. The control system 14 may be partly or entirely integrated in the teach pendant unit 16. In this case, the control system 14 may communicate with a controller (not shown) of the industrial robot 12.

The human 20 can work in close proximity to the industrial robot 12 while power to motors of the industrial robot 12 is available. Physical contact between the human 20 and the industrial robot 12 can thus occur within the collaborative workspace 22. The collaborative workspace 22 may be smaller than an operating space of the industrial robot 12. Thus, a part of the operating space of the industrial robot 12 may not be used for collaborative work.

Figure 2:
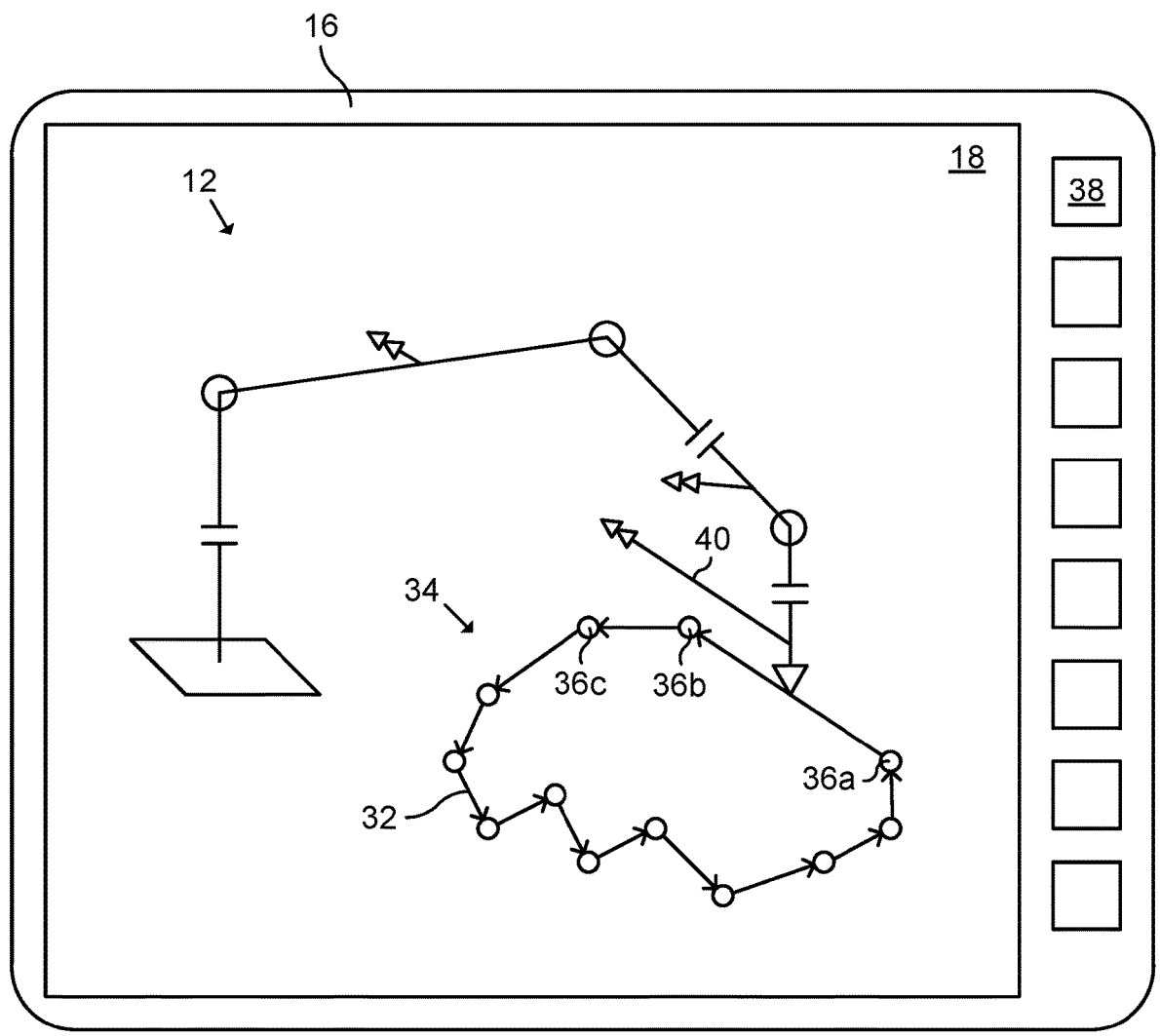
FIG. 2: schematically represents a teach pendant unit of the robot system visualizing a nominal path and indications on a display.

FIG. 2 schematically represents the teach pendant unit 16. In FIG. 2, the teach pendant unit 16 visualizes the industrial robot 12 and a nominal path 32 of the industrial robot 12 on the display 18. The nominal path 32 is associated with a nominal trajectory 34 of the industrial robot 12. The nominal trajectory 34 is a speed profile of the industrial robot 12 along the nominal path 32.

In this example, a plurality of target points of the nominal path 32 are also shown on the display 18. In FIG. 2, a first target point 36a, a second target point 36b and a third target point 36c are denoted. One, several or all of the target points may also be referred to with reference numeral "36". A movement segment is defined between each pair of adjacent target points 36. Each movement segment may be an interpolation, for example a linear interpolation, between two target points 36.

The teach pendant unit 16 of this example further comprises a plurality of buttons 38. By means of the buttons 38, the user can provide a user input. The user input may be related to a modification of the nominal trajectory 34. Various other user inputs as described herein can also be provided by means of the buttons 38.

As shown in FIG. 2, a plurality of indications 40 are also visualized on the display 18. Each indication 40 represents a value of a parameter of the industrial robot 12 as when executing the nominal trajectory 34. In this example, the indications 40 are arrows indicating a direction and magnitude of a kinetic energy of some of the links 24. The longer the arrow, the higher the kinetic energy. In FIG. 2, the indications 40 show the direction and the magnitude of the respective kinetic energy as when the industrial robot 12 moves between the first target point 36a and the second target point 36b.

Figure 3:
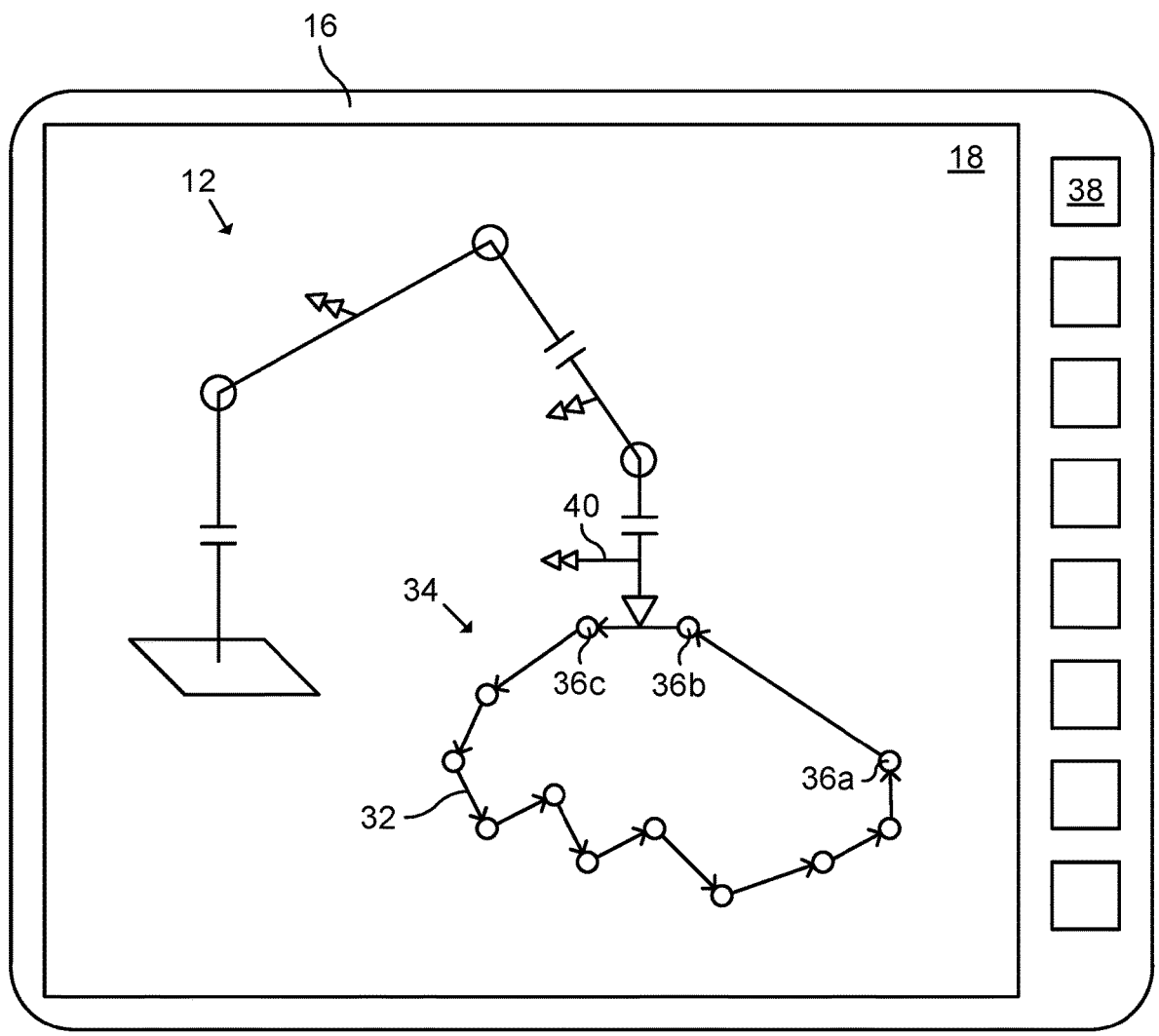
FIG. 3: schematically represents the teach pendant unit visualizing the nominal path and further indications on the display.

FIG. 3 schematically represents the teach pendant unit 16 visualizing the nominal path 32 and further indications 40 on the display 18. In FIG. 3, the indications 40 show the direction and the magnitude of the respective kinetic energy as when the industrial robot 12 moves between the second target point 36b and the third target point 36c.

Due to the visualization of the indications 40 of the values of the kinetic energies according to FIGS. 2 and 3, the user can easily perceive a risk potential of a physical contact between the industrial robot 12 and the human 20. For example, in order to fulfill ISO/TS 15066: 2016, a high number of considerations regarding operations of the industrial robot 12 needs to be made. The method of visualizing the nominal path 32 and the indications 40 greatly assists the user in these considerations. The user can thereby see the kinetic energies of one or more links 24 along the nominal path 32. The kinetic energies are associated with the energy transfer in a collision with the human 20. The user can thereby easily assess the severity of a potential collision between the industrial robot 12 and the human 20 in order to make a risk assessment. The aim of such risk assessment is to ensure that a possible physical contact between the industrial robot 12 and the human 20 does not result in harm to the human 20. By means of the method, a risk potential for such contacts can be quickly and intuitively evaluated.

For example, the user can easily see that the kinetic energy of the seventh link 24g and the end effector 26 is substantially higher when the industrial robot 12 moves from the first target point 36a to the second target point 36b (FIG. 2) than from the second target point 36b to the third target point 36c (FIG. 3). Based upon the information obtained from the indications 40, the user may then provide a user input to modify the nominal trajectory 34 in order to reduce the kinetic energy of the seventh link 24g and the end effector 26 between the first target point 36a and the second target point 36c.

According to one example, the user modifies the nominal trajectory 34 by moving the first target point 36a and by adding an additional target point. In this way, both the nominal path 32 and the nominal trajectory 34 are modified.

Figure 4:
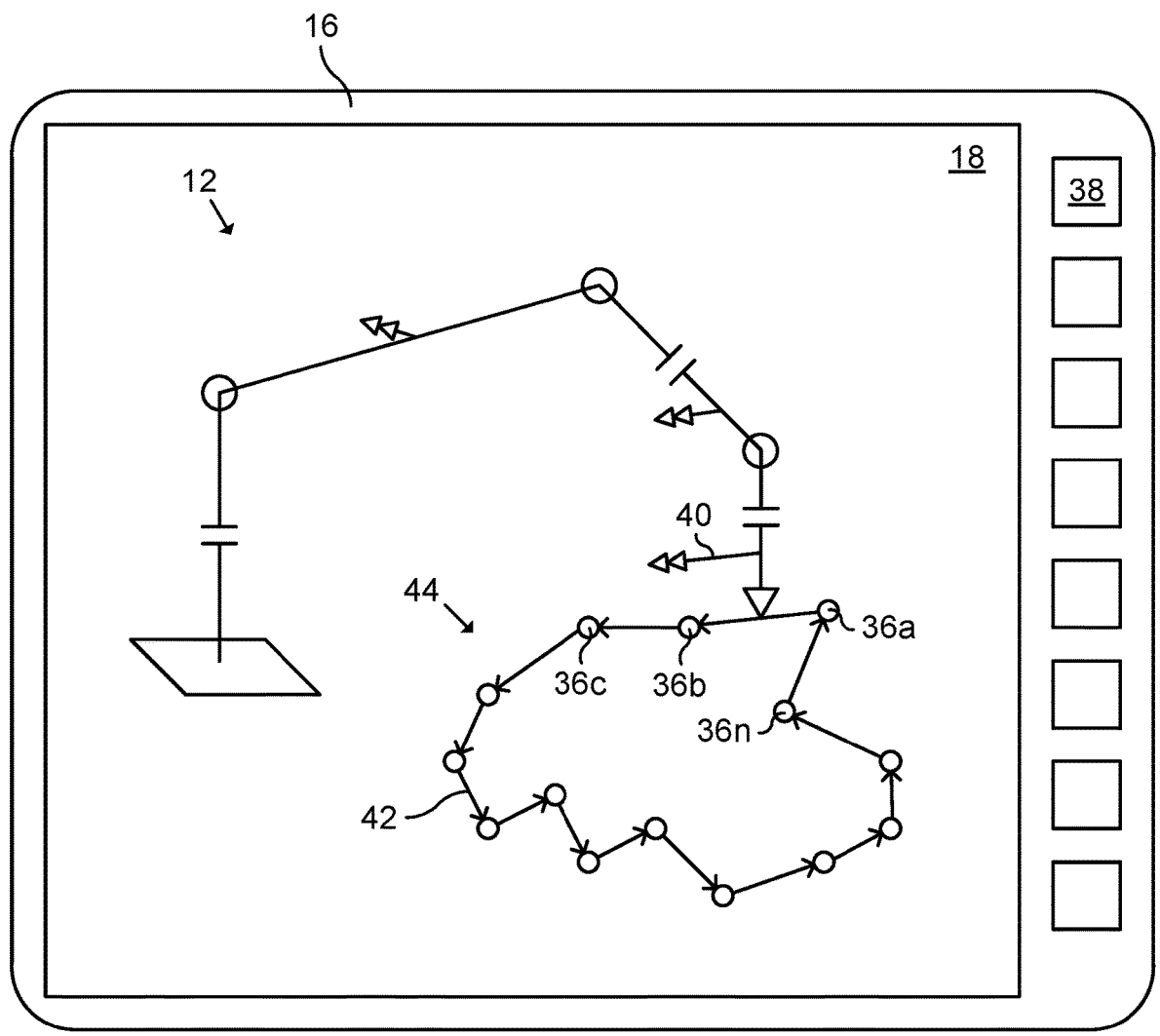
FIG. 4: schematically represents the teach pendant unit visualizing a modified path and further indications on the display.

FIG. 4 schematically represents the teach pendant unit 16 visualizing a modified path 42 and a modified trajectory 44. In comparison with the nominal path 32 and the nominal trajectory 34 in FIGS. 2 and 3, the modified path 42 and the modified trajectory 44 in FIG. 4 comprise a moved first target point 36a and an additional target point 36n.

The teach pendant unit 16 now visualizes the modified path 42. As shown in FIG. 4, the indication 40 illustrates that the kinetic energy of the seventh link 24g and the end effector 26 is now lower between the first target point 36a and the second target point 36b. The user may now save the modified trajectory 44. The modified trajectory 44 is then executed by the industrial robot 12. The nominal trajectory 34 may alternatively be automatically modified to provide the modified trajectory 44, for example by means of optimization.

Figure 5:
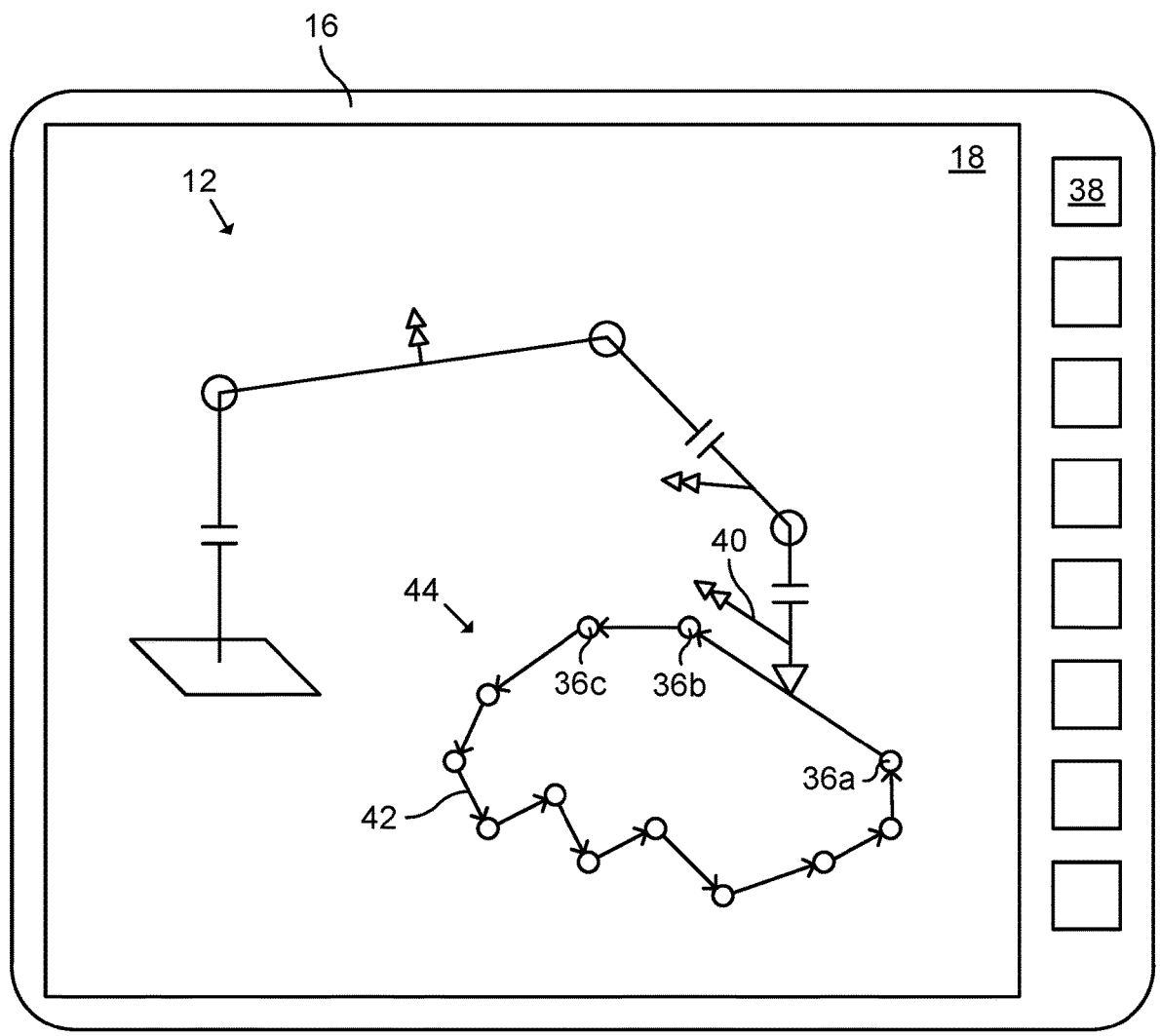
FIG. 5: schematically represents the teach pendant unit visualizing a modified trajectory and further indications on the display.

FIG. 5 schematically represents the teach pendant unit 16 visualizing a modified trajectory 44, a modified path 42 associated with the modified trajectory 44 and further indications 40 on the display 18. Also in FIG. 5, each indication 40 is illustrative of a direction and a magnitude of a kinetic energy of several links 24 of the industrial robot 12. FIG. 5 differs from FIG. 4 in that instead of modifying the nominal path 32, only the nominal trajectory 34 is modified. In FIG. 5, the nominal trajectory 34 in FIGS. 2 and 3 has been modified by lowering the speed of the industrial robot 12 from the first target point 36a to the second target point 36b. The teach pendant unit 16 now visualizes the modified path 42 (which in this example is the same as the nominal path 32) associated with the modified trajectory 44. As shown in FIG. 5, one of the indications 40 illustrates that the kinetic energy of the seventh link 24g and the end effector 26 is now lower between the first target point 36a and the second target point 36b. The user may now save the modified trajectory 44 according to FIG. 5 for execution by the industrial robot 12.

Figure 6:
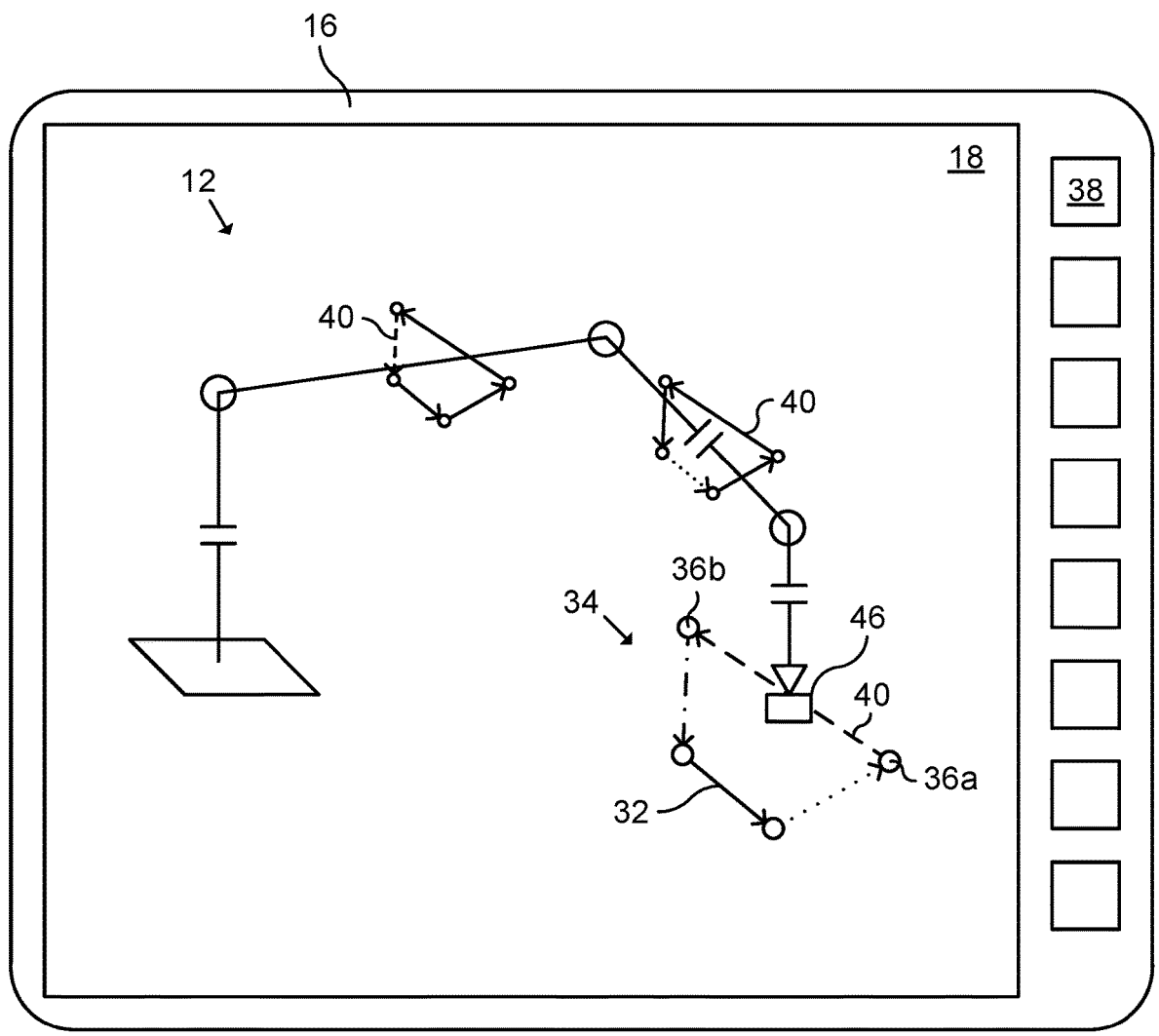
FIG. 6: schematically represents the teach pendant unit visualizing a nominal path and further indications on the display.

FIG. 6 schematically represents the teach pendant unit 16 visualizing a nominal path 32 and further indications 40 on the display 18. In FIG. 6, a workpiece 46 held by the end effector 26 is also shown. In FIG. 6, the movement segments between the target points 36 are illustrated with different line types. The different line types may be substituted for different colors. The line types of the movement segments of the nominal path 32 each constitutes an indication 40 of a magnitude of kinetic energy of the workpiece 46 when being moved along the respective movement segment. In FIG. 6, also kinetic energies of the third link 24c and of the fifth link 24e are visualized by indications 40 of the same type. The line type between the first target point 36a and the second target point 36b may be used to visualize that the kinetic energy of the industrial robot 12 for this movement segment exceeds a threshold value.

The indications 40 of values of kinetic energies according to FIGS. 2-6 are merely some of numerous possible visualizations for evaluating a risk potential of a physical contact between the industrial robot 12 and the human 20.

A type of contact may also be displayed and/or considered. The display 18 may for example visualize the indications 40 for either a quasi-static contact or for a transient contact with the human 20. The teach pendant unit 16 may thus be configured to receive a user input indicative of a type of contact.

A quasi-static contact includes clamping or crushing situations in which the human's 20 body part is trapped between a moving part of the industrial robot 12 and another fixed or moving part of the robot system 10. In such a situation, the industrial robot 12 would apply a pressure or force to the trapped body part for an extended time interval until the condition can be alleviated.

A transient contact, also referred to as a dynamic impact, describes a situation in which the human's 20 body part is impacted by a moving part of the industrial robot 12 and thus can recoil or retract from the industrial robot 12 without clamping or trapping the contacted body area, thus making for a short duration of the actual contact. The transient contact is dependent on the combination of the inertia of the industrial robot 12, the inertia of the human's 20 body part and the relative speed between the two.

The relevant inertia of the industrial robot 12 may be computed anywhere along the length of the kinematic chain of the industrial robot 12. An estimation of the inertia may make use of the pose of the industrial robot 12, speeds of the links 24, mass distribution, moving mass and/or contact location.

Also the effective mass of the industrial robot 12 may be displayed and/or used as a basis for determining a value of the at least one parameter. The effective mass $m_R$ of the industrial robot 12 may be conservatively estimated as a function of the payload capacity of the industrial robot 12 and the mass M of the moving parts of the industrial robot 12. The effective mass $m_R$ of the industrial robot 12 may for example (according to ISO/TS 15066: 2016) be calculated as:

$$\frac{M}{2} + m_L$$

where $m_L$ is the effective payload of the industrial robot 12 and M is the total mass of the moving parts of the industrial robot 12. For example, the kinetic energy may be determined based on the effective mass.

For each body part, a maximum permissible energy transfer E can be calculated as:

$$E = \frac{F_{max}^2}{2k} = \frac{A^2 p_{max}^2}{2k}$$

where $F_{max}$ is the maximum contact force for a specific body part, $p_{max}$ is the maximum contact pressure for a specific body area, k is the effective spring constant for the specific body part, and A is the area of contact between the industrial robot 12 and the human 20. The indications 40 may thus show whether the maximum permissible energy transfer E for a specific body part of the human 20 is exceeded. For example, the indications 40 may be of red color when the energy transfer is higher than the maximum permissible energy transfer E for a particular body part and may be of green color when the energy transfer is lower than the maximum permissible energy transfer E for the particular body part.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

The invention claimed is:

1. A method of controlling an industrial robot, the method comprising:

visualizing a nominal path of the industrial robot, the nominal path being associated with a nominal trajectory of the industrial robot;

visualizing indications that are representative of values of at least one parameter of the industrial robot as when executing the nominal trajectory, for evaluating a risk of injury of a physical contact between the industrial robot and a human should such physical contact occur, wherein the visualized indications assist in evaluating the risk of injury;

receiving a user input related to the nominal trajectory;

modifying the nominal trajectory based on the user input to provide a modified trajectory; and executing the modified trajectory by the industrial robot wherein the indications comprise a direction associated with a respective value of the at least one parameter.

2. The method according to claim 1, wherein the at least one parameter comprises acceleration, force, torque, pressure and/or kinetic energy.

3. The method according to claim 1, further comprising estimating an effective mass of the industrial robot, and determining values of the at least one parameter based on the effective mass.

4. The method according to claim 1, wherein the indications comprise indications of values of the at least one parameter in relation to a specific body part of the human.

5. The method according to claim 1, wherein the indications comprise indications of values of the at least one parameter in relation to a type of contact event between the industrial robot and the human.

6. The method according to claim 1, further comprising visualizing the industrial robot.

7. The method according to claim 6, wherein the indications comprise indications of values of at least one parameter of a part of the industrial robot.

8. The method according to claim 1, wherein the indications comprise indications visualized along the nominal path.

9. The method according to claim 1, wherein the indications are color indications.

10. The method according to claim 1, wherein the indications show whether the values are below or above a threshold value.

11. The method according to claim 1, further comprising:

visualizing a modified path associated with the modified trajectory; and visualizing indications of values of the at least one parameter of the industrial robot as when executing the modified trajectory.

12. The method according to claim 1, further comprising automatically modifying the nominal trajectory to provide the modified trajectory in response to the user input.

13. The method according to claim 12, wherein the automatic modification comprises optimizing the nominal trajectory with a condition to provide a modified trajectory with values of the at least one parameter below a threshold value at least partly along a modified path associated with the modified trajectory.

14. The method according to claim 12, wherein the automatic modification comprises optimizing the nominal trajectory to minimize a time of a movement between two target points along the nominal path.

15. The method according to claim 1, wherein the industrial robot is designed to interact with a human in a shared collaborative workspace.

16. The method according to claim 1, wherein the indications are illustrations that assist user perception of the values of the at least one parameter and that reflect more than just the values themselves.

17. The method according to claim 1, wherein the direction is visualized with an arrow and a length of the arrow indicates a magnitude of the respective value of the at least one parameter.

18. A control system for controlling an industrial robot, the control system comprising at least one data processing device and at least one memory having a computer program stored thereon, the computer program comprising program code which, when executed by the at least one data processing device, causes the at least one data processing device to perform the steps of:
    commanding visualization of a nominal path of the industrial robot, the nominal path being associated with a nominal trajectory of the industrial robot;
    commanding visualization of indications that are representative of values of at least one parameter of the industrial robot as when executing the nominal trajectory, for evaluating a risk of injury of a physical contact between the industrial robot and a human should such physical contact occur, wherein the visualized indications assist in evaluating the risk of injury;
    receiving a user input related to the nominal trajectory;
    modifying the nominal trajectory based on the user input to provide a modified trajectory; and
    commanding execution of the modified trajectory by the industrial robot;
    wherein the indications comprise a direction associated with a respective value of the at least one parameter.

19. A robot system comprising:
    an industrial robot; and
    a control system for controlling the industrial robot, the control system includes at least one data processing device and at least one memory having a computer program stored thereon, the computer program comprising program code which, when executed by the at least one data processing device, causes the at least one data processing device to perform the steps of:
    commanding visualization of a nominal path of the industrial robot, the nominal path being associated with a nominal trajectory of the industrial robot;
    commanding visualization that are representative of indications of values of at least one parameter of the industrial robot as when executing the nominal trajectory, for evaluating a risk of injury of a physical contact between the industrial robot and a human should such physical contact occur, wherein the visualized indications assist in evaluating the risk of injury;
    receiving a user input related to the nominal trajectory;
    modifying the nominal trajectory based on the user input to provide a modified trajectory; and
    commanding execution of the modified trajectory by the industrial robot;
    wherein the indications comprise a direction associated with a respective value of the at least one parameter.

* * * * *